(12) United States Patent
Choi et al.

(10) Patent No.: US 12,265,303 B2
(45) Date of Patent: Apr. 1, 2025

(54) DISPLAY APPARATUS INCLUDING A LIGHT GUIDE PLATE HOLDER

(71) Applicant: SAMSUNG ELECTRONICS CO., LTD., Suwon-si (KR)

(72) Inventors: Sungpil Choi, Suwon-si (KR); Byoungjin Cho, Suwon-si (KR); Yeonkyun Park, Suwon-si (KR); Yonghwan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/213,615

(22) Filed: Jun. 23, 2023

(65) Prior Publication Data

US 2024/0069386 A1 Feb. 29, 2024

Related U.S. Application Data

(63) Continuation of application No. PCT/KR2023/008200, filed on Jun. 14, 2023.

(30) Foreign Application Priority Data

Aug. 23, 2022 (KR) .................. 10-2022-0105767

(51) Int. Cl.
*G02F 1/1333* (2006.01)
*F21V 8/00* (2006.01)
(Continued)

(52) U.S. Cl.
CPC ..... *G02F 1/133615* (2013.01); *G02B 6/0088* (2013.01); *G02B 6/0091* (2013.01);
(Continued)

(58) Field of Classification Search
CPC .................. G02F 1/133314; G02F 1/133322
See application file for complete search history.

(56) References Cited

U.S. PATENT DOCUMENTS

| 7,372,519 B2 | 5/2008 | Kim et al. |
| 9,817,182 B2 | 11/2017 | Choi et al. |
| 10,185,080 B2 | 1/2019 | Horiguchi |

(Continued)

FOREIGN PATENT DOCUMENTS

| CN | 216848406 U | 6/2022 |
| JP | 2000-353422 A | 12/2000 |

(Continued)

OTHER PUBLICATIONS

International Search Report (PCT/ISA/210) issued on Sep. 21, 2023 by the International Searching Authority in International Patent Application No. PCT/KR2023/008200.

(Continued)

*Primary Examiner* — Paisley L Wilson
(74) *Attorney, Agent, or Firm* — Sughrue Mion, PLLC

(57) ABSTRACT

A display apparatus includes a liquid crystal panel; a light guide plate behind the liquid crystal panel; a light source adjacent to a thickness surface of the light guide plate and configured to emit light toward the thickness surface of the light guide plate; a rear chassis behind the light guide plate; and a holder coupled to the rear chassis and supporting the light guide plate, wherein the holder includes: a first tooth; a first tooth groove next to the first tooth; a second tooth facing the first tooth; and a second tooth groove next to the second tooth, wherein in a first state, the first tooth is disposed outside the second tooth groove and the second tooth is disposed outside the first tooth groove, and in a second state, the first tooth is inserted into the second tooth groove and the second tooth is inserted into the first tooth groove, and wherein the holder is configured to elastically deform between the first state and the second state.

17 Claims, 14 Drawing Sheets

(51) Int. Cl.
*G02F 1/13357* (2006.01)
*G02F 1/1339* (2006.01)

(52) U.S. Cl.
CPC .. *G02F 1/133314* (2021.01); *G02F 1/133322* (2021.01); *G02F 1/1339* (2013.01)

(56) References Cited

U.S. PATENT DOCUMENTS

| | | | |
|---|---|---|---|
| 2009/0009946 A1* | 1/2009 | Oomoto | F16M 13/02 |
| | | | 361/679.27 |
| 2017/0108638 A1* | 4/2017 | Teragawa | G02B 6/0091 |
| 2018/0113252 A1* | 4/2018 | Lee | G02B 6/00 |
| 2018/0120633 A1* | 5/2018 | Yang | G02B 6/0088 |
| 2018/0203298 A1* | 7/2018 | Gai | G02F 1/133308 |

FOREIGN PATENT DOCUMENTS

| | | |
|---|---|---|
| JP | 2014-49404 A | 3/2014 |
| JP | 2020-4692 A | 1/2020 |
| KR | 10-2006-0048084 A | 5/2006 |
| KR | 10-1152844 B1 | 6/2012 |
| KR | 10-1246237 B1 | 3/2013 |
| KR | 10-2017-0053921 A | 5/2017 |
| KR | 10-2017-0062120 A | 6/2017 |
| KR | 10-2017-0080956 A | 7/2017 |
| KR | 10-2017-0125510 A | 11/2017 |
| KR | 10-2018-0025463 A | 3/2018 |
| KR | 10-1835116 B1 | 3/2018 |
| KR | 10-2019-0047265 A | 5/2019 |
| KR | 10-2226237 B1 | 3/2021 |
| KR | 10-2400279 B1 | 5/2022 |
| WO | 2015/053085 A1 | 4/2015 |

OTHER PUBLICATIONS

Written Opinion (PCT/ISA/237) issued on Sep. 21, 2023 by the International Searching Authority in International Patent Application No. PCT/KR2023/008200.

* cited by examiner

DISPLAY APPARATUS INCLUDING A LIGHT GUIDE PLATE HOLDER

CROSS-REFERENCE TO RELATED APPLICATION(S)

This application is a by-pass continuation application of International Application No. PCT/KR2023/008200, filed on Jun. 14, 2023, which claims priority to Korean Patent Application No. 10-2022-0105767, filed on Aug. 23, 2022, in the Korean Intellectual Property Office, the disclosures of which are incorporated by reference herein in their entireties.

BACKGROUND

1. Field

The disclosure relates to a display apparatus including an edge type backlight unit.

2. Description of Related Art

A display apparatus is a type of output device that converts obtained or stored electrical information into visual information and displays the visual information to a user. The display apparatus is used in various fields such as homes and workplaces.

The display apparatus may include a self-luminous liquid crystal panel or a non-self-luminous liquid crystal panel.

A display apparatus to which the non-self-luminous liquid crystal panel is mounted may include a liquid crystal panel and a backlight unit configured to supply light to the liquid crystal panel.

The backlight unit includes a light source module composed of a light source and a printed circuit board, and various optical members, and may be classified into a direct type and an edge type according to the position of the light source. The edge-type backlight unit includes a light guide plate (LGP) to guide light emitted from a light source to a liquid crystal panel.

The light guide plate is generally formed of a plastic material such as Polymethyl methacrylate (PMMA) because the PMMA has excellent light transmittance. However, because the PMMA is sensitive to a thermal environment, the light guide plate may be easily thermally expanded when a temperature of the display apparatus rises.

SUMMARY

Provided is a display apparatus including a holder provided to support a light guide plate.

Further, provided is a display apparatus including a holder capable of firmly supporting a light guide plate under a general distribution and a normal use condition, and capable of, when the light guide plate is thermally expanded under high temperature conditions during driving of the display apparatus, being flexibly deformed according to deformation of the light guide plate.

Additional aspects of the disclosure will be set forth in part in the description which follows and, in part, will be apparent from the description, or may be learned by practice of the presented embodiments.

According to an aspect of the disclosure, a display apparatus includes: a liquid crystal panel, a light guide plate behind the liquid crystal panel, a light source adjacent to a thickness surface of the light guide plate and configured to emit light toward the thickness surface of the light guide plate; a rear chassis behind the light guide plate, and a holder coupled to the rear chassis and supporting the light guide plate, wherein the holder includes: a first tooth; a first tooth groove next to the first tooth; a second tooth facing the first tooth; and a second tooth groove next to the second tooth, wherein in a first state, the first tooth is disposed outside the second tooth groove and the second tooth is disposed outside the first tooth groove, and in a second state, the first tooth is inserted into the second tooth groove and the second tooth is inserted into the first tooth groove, and wherein the holder is configured to elastically deform between the first state and the second state.

The first tooth may include a first end support surface at an end of the first tooth, the second tooth may include a second end support surface at an end of the second tooth, and the first end support surface and the second end support surface contact each other in the first state.

Each of the first end support surface and the second end support surface may be convex.

Each of the first end support surface and the second end support surface may be a curved surface.

The first tooth and the second tooth may be separated from each other in the first state.

The holder may further include: a holder body; a light guide plate support supporting the light guide plate and spaced apart from the holder body; and a first elastic connector connecting the holder body and the light guide plate support, n the first tooth and the second tooth are disposed between the holder body and the light guide plate support.

The first tooth may protrude from the holder body toward the light guide plate support, and the second tooth may protrude from the light guide plate support toward the holder body.

The first elastic connector may extend from a first end of the light guide plate support in a longitudinal direction.

The display apparatus may further include a second elastic connector connecting the holder body and the light guide plate support, wherein the second elastic connector extends from a second end of the light guide plate support in the longitudinal direction.

The first tooth and the second tooth may be disposed between the first elastic connector and the second elastic connector.

The holder further may include another first tooth next to the first tooth, and the first tooth groove may be between the first tooth and the other first tooth.

The holder may include another second tooth next to the second tooth, and the second tooth faces the second first tooth, and the second tooth groove is between the second tooth and the other second tooth.

The holder further may include a locking groove fitted and coupled to a locking protrusion of the rear chassis.

The display apparatus may further include: a spacer configured to maintain a constant gap between the light guide plate and the light source.

The spacer may be coupled to the rear chassis.

According to an aspect of the disclosure, a display apparatus includes: a liquid crystal panel: a light guide plate behind the liquid crystal panel and including an upper thickness surface, a lower thickness surface, a left thickness surface, and a right thickness surface; a light source adjacent to the lower thickness surface of the light guide plate and configured to emit light toward the lower thickness surface of the light guide plate; a rear chassis behind the light guide plate; and a pair of holders coupled to an upper left corner of the rear chassis and an upper right corner of the rear chassis and configured to support the light guide plate, wherein each holder of the pair of the holders may include: a holder body; a first light guide plate support supporting the light guide plate and spaced apart from the holder body; a first elastic connector connecting the holder body and the light guide plate support; a first tooth protruding from the holder body toward the light guide plate support; and a second tooth protruding from the light guide plate support toward the holder body and facing the first tooth.

The display apparatus may further include: a pair of spacers coupled to a lower left corner of the rear chassis and a lower right corner of the rear chassis and configured to maintain a constant gap between the light guide plate and the light source.

The holder body may include: a horizontal body member extending in a left direction and a right direction of the display apparatus; and a vertical body member extending in an up direction and a down direction of the display apparatus, and the first light guide plate The display apparatus may further include: a second light guide plate support supporting the light guide plate and parallel to the vertical body member; and a second elastic connector connecting the vertical body member and the second light guide plate support.

The display apparatus may further include; a third tooth protruding from the vertical body member toward the second light guide plate support; and a fourth tooth protruding from the second light guide plate support toward the vertical body member, and the third tooth faces the fourth tooth.

According to an aspect of the disclosure, a light guide plate holder includes; a holder body including a first body member extending along a first edge of a light guide plate; a first light guide plate support supporting the light guide plate, wherein the first light guide plate support is parallel to and spaced apart from the first body member; a first elastic connector connecting the first body member and the first light guide plate support; a plurality of first teeth protruding from the first body member toward the first light guide plate support; a plurality of second teeth protruding from the first light guide plate support toward the first body member, a plurality of first grooves between the plurality of first teeth; and a plurality of second grooves between the plurality of second teeth, wherein, in a first state, the plurality of first teeth are aligned with the plurality of second teeth, wherein, in a second state, the plurality of first teeth are inserted into the plurality of second grooves and the plurality of second teeth are inserted into the plurality of first grooves, and wherein the holder body is configured to elastically deform between the first state and the second state according to changes in shape of the light guide plate.

The holder body may further include a second body member extending along a second edge of the light guide plate, the light guide plate holder may further include: a second light guide plate support supporting the light guide plate, wherein the second light guide plate support is parallel to and spaced apart from the second body member; a second elastic connector connecting the second body member and the second light guide plate support; a plurality of third teeth protruding from the second body member toward the second light guide plate support; a plurality of fourth teeth protruding from the second light guide plate support toward the second body member, a plurality of third grooves between the plurality of third teeth; and a plurality of fourth grooves between the plurality of fourth teeth, wherein, in the first state, the plurality of third teeth are aligned with the plurality of fourth teeth, and wherein, in the second state, the plurality of third teeth are inserted into the plurality of fourth grooves and the plurality of fourth teeth are inserted into the plurality of third grooves.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
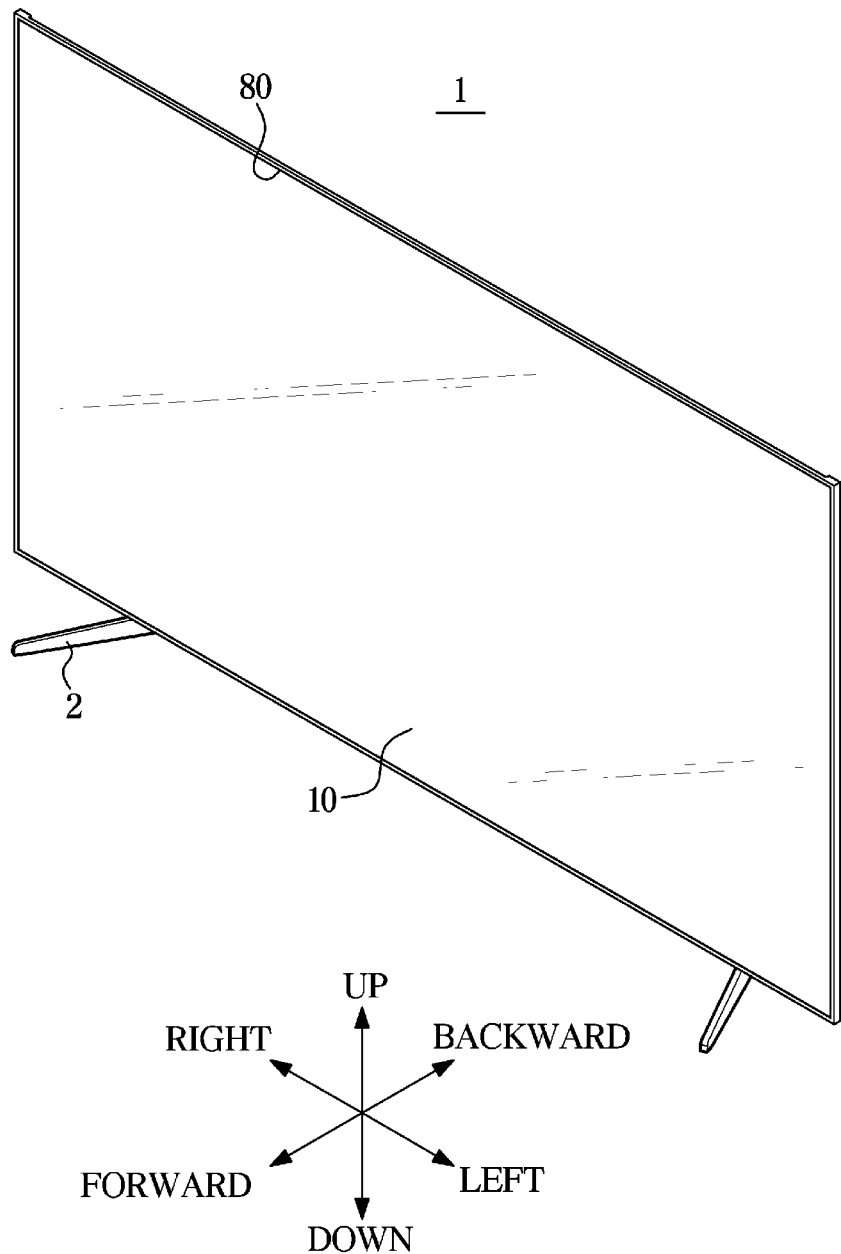
FIG. 1 is a view illustrating an appearance of a display apparatus according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

The singular forms "a," "an" and "the" are intended to include the plural forms as well, unless the context clearly indicates otherwise. Shapes and sizes of elements in the drawings may be exaggerated for clear description.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

In this disclosure, expressions of ordinal numbers such as "first" and "second" are used to distinguish a plurality of components from each other, and the used ordinal numbers may not indicate the order of arrangement and the importance of manufacturing order between components.

The term of "and/or" includes a plurality of combinations of relevant items or any one item among a plurality of relevant items.

Throughout the description, when a member is "on" another member, this includes not only when the member is in contact with the other member, but also when there is another member between the two members.

Herein, the expression "at least one of a, b or c" indicates only a, only b, only c, both a and b, both a and c, both b and c, or all of a, b, and c.

In the following detailed description, the terms of "up and down direction", "lower side", "front and rear direction", and the like may be defined by a direction arrow of FIG. 1, but the shape and the location of the component is not limited by the term.

Reference will now be made in detail to embodiments of the disclosure, examples of which are illustrated in the accompanying drawings.

Figure 2:
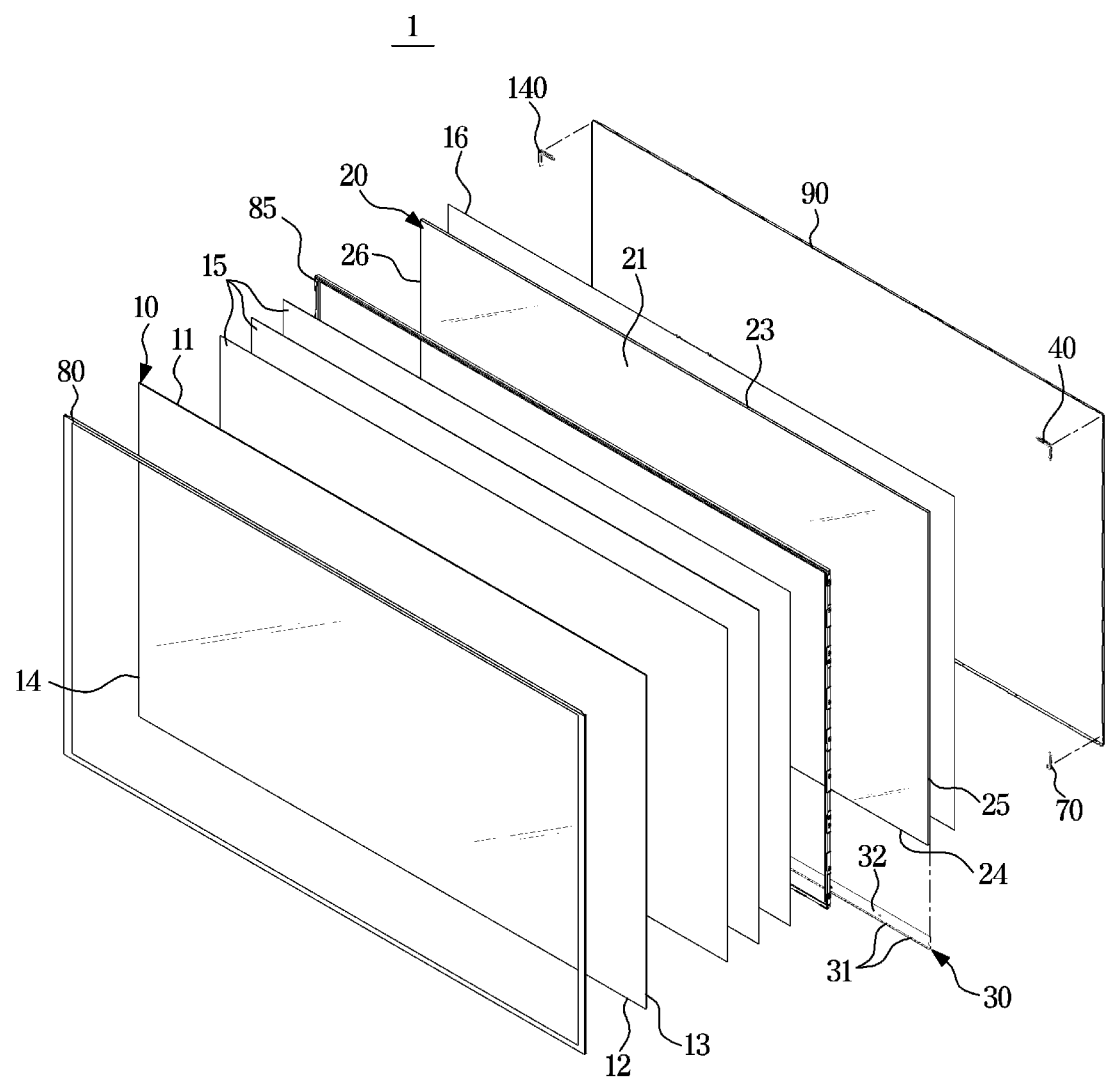
FIG. 2 is an exploded view illustrating a configuration of the display apparatus according to an embodiment of the disclosure.
Figure 3:
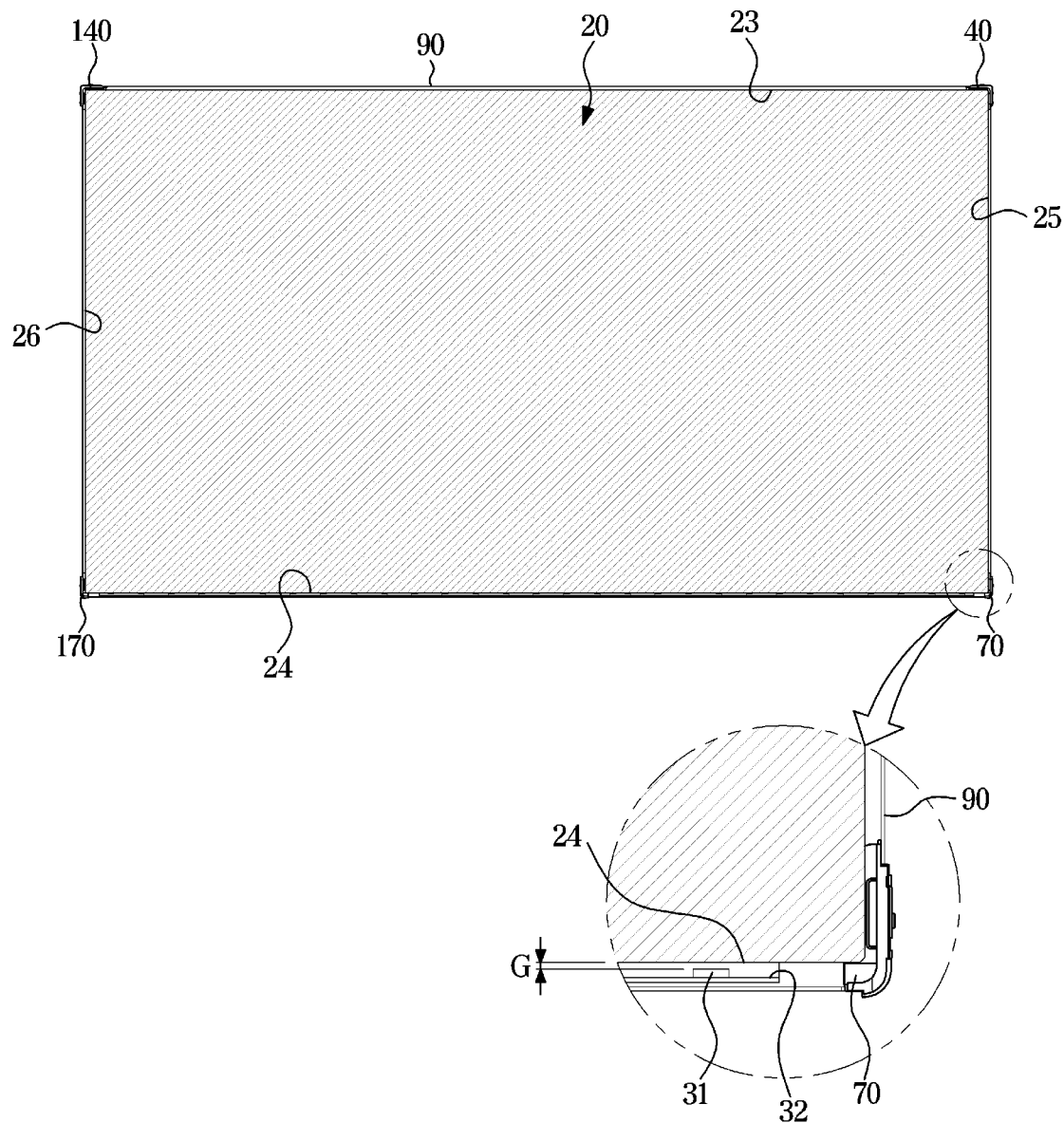
FIG. 3 is a front view illustrating some components such as a light guide plate according to an embodiment of the disclosure.
Figure 4:
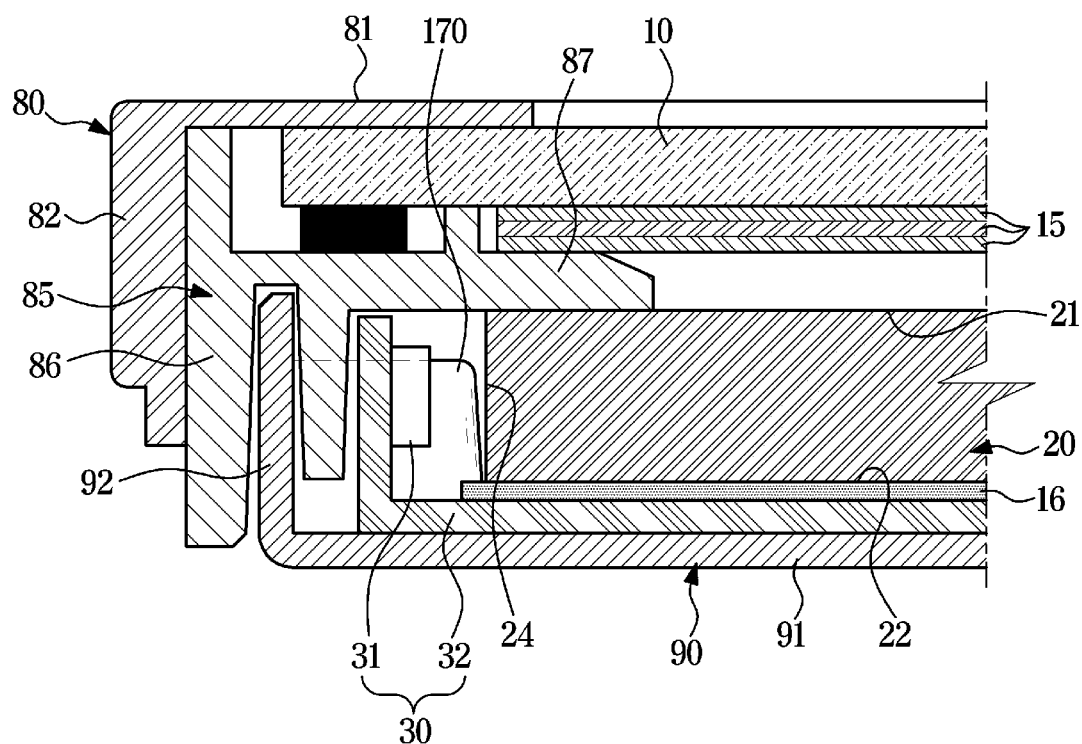
FIG. 4 is a cross-sectional view of the display apparatus according to an embodiment of the disclosure.

FIG. 1 is a view illustrating an appearance of a display apparatus according to an embodiment of the disclosure. FIG. 2 is an exploded view illustrating a configuration of the display apparatus according to an embodiment of the disclosure. FIG. 3 is a front view illustrating some components such as a light guide plate according to an embodiment of the disclosure. FIG. 4 is a cross-sectional view of the display apparatus according to an embodiment of the disclosure.

Referring to FIGS. 1 to 4, a display apparatus 1 is a device that displays information, material, data, etc. as the form of characters, figures, graphs, images, etc. The display apparatus 1 may include a television that is a medium of telecommunication and transmits a moving image and an image signal, and a monitor that is a kind of computer output device. The display apparatus 1 may be a flat display apparatus including a flat screen as in the embodiment. Alternatively, the display apparatus 1 may be a curved display apparatus including a curved screen, or a bendable display apparatus including a screen that varies from a flat surface to a curved surface and from a curved surface to a flat surface or that has a variable curvature.

The display apparatus 1 may be installed on an indoor/outdoor floor surface or furniture in a standing manner, or may be installed on a wall or inside a wall in a wall-hanging type. A support leg 2 may be provided at a bottom of the display apparatus 1 so as to be installed on an indoor/outdoor floor surface or on furniture in the standing manner.

The display apparatus 1 may include a liquid crystal panel 10 provided to display an image, a backlight unit configured to emit light toward the liquid crystal panel 10, and a chassis assembly provided to support the liquid crystal panel 10 and the backlight unit.

The liquid crystal panel 10 may display an image using liquid crystal that exhibits optical properties according to changes in voltage and temperature. The liquid crystal panel 10 may include a thin film transistor (TFT) substrate, a color filter substrate coupled to face the TFT substrate, and a liquid crystal injected between the TFT substrate and the color filter substrate.

A screen of the liquid crystal panel 10 may have a substantially rectangular shape. The screen of the liquid crystal panel 10 may include a pair of long sides 11 and 12 and a pair of short sides 13 and 14.

The backlight unit may include a light source 31 configured to emit light and a light guide plate 20 configured to guide the light emitted from the light source 31 to the liquid crystal panel 10.

The light source 31 may be mounted on a printed circuit board 32. The light source 31 may be vertically mounted on the printed circuit board 32. A circuit pattern for transmitting driving power and signals to the light source 31 may be formed on the printed circuit board 32. A light source module 30 may include the light source 31 and the printed circuit board 32. A light emitting diode (LED), a cold cathode fluorescent lamp (CCFL), an external electrode fluorescent lamp (EEFL), or the like may be used as the light source 31.

The light source 31 may be provided in plurality. A plurality of light sources 31 may be arranged in a line on the printed circuit board 32. The plurality of light sources 31 may be mounted on the printed circuit board 32 so as to be spaced apart from each other at regular intervals.

The light guide plate 20 may be disposed behind the liquid crystal panel 10. The light guide plate 20 may convert light emitted from the light source 31 into surface light and guide the surface light to the liquid crystal panel 10. The light guide plate 20 may be formed of a Polymethyl methacrylate (PMMA) material. Various patterns for changing light paths may be formed on the light guide plate 20.

The light guide plate 20 may be formed in a substantially rectangular parallelepiped shape. That is, the light guide plate 20 may include a front surface 21, a rear surface 22, and thickness surfaces 23, 24, 25, and 26. The thickness surfaces 23, 24, 25, and 26 may include an upper thickness surface 23, a lower thickness surface 24, a left thickness surface 25, and a right thickness surface 26. Light may be incident to the light guide plate 20 through at least one of the thickness surfaces 23, 24, 25, and 26 of the light guide plate 20, and light may be exited from the light guide plate through the front surface 21 of the light guide plate 20. The light exited through the front surface 21 of the light guide plate 20 may be guided to the liquid crystal panel 10. Therefore, among the thickness surfaces 23, 24, 25, and 26 of the light guide plate 20, a surface on which light is incident may be referred to as an incident surface of the light guide plate 20, and the front surface 21 of the light guide plate 20 may be referred to as an exit surface of the light guide plate 20.

According to an embodiment, the light source 31 may emit light toward the lower thickness surface 24 of the thickness surfaces 23, 24, 25, and 26 of the light guide plate 20. For this, the light source 31 may be disposed adjacent to the lower thickness surface 24 of the light guide plate 20. The printed circuit board 32 may be disposed in a left and right direction to be parallel to the lower thickness surface 24 of the light guide plate 20. The plurality of light sources 31 may be arranged in the left and right direction to be parallel to the lower thickness surface 24.

However, the arrangement of the light source 31 is not limited thereto, and in order to allow light to be incident to the light guide plate 20 through at least one of the thickness surfaces 23, 24, 25, and 26 of the light guide plate 20, the light source 31 may be disposed adjacent to at least one of the thickness surfaces 23, 24, 25, and 26 of the light guide plate 20.

When a distance between the light source 31 and the light guide plate 20 changes, the luminance of the display apparatus may change. Therefore, a gap G between the light source 31 and the light guide plate 20 needs to be kept constant to allow the luminance of the display apparatus to be kept constant. For this, the display apparatus 1 may include spacers 70 and 170 provided to maintain the gap G between the light guide plate 20 and the light source 31.

Because the light source 31 is provided on the side of the lower thickness surface 24 of the light guide plate 20 according to an embodiment of the disclosure, the spacers 70 and 170 may be provided in a lower portion of the rear chassis 90.

Particularly, the spacers 70 and 170 may be provided in plurality, the spacer 70 may be provided at a lower left corner of the rear chassis 90, and the spacer 170 may be provided at a lower right corner of the rear chassis 90. The spacers 70 and 170 may be coupled to the rear chassis 90. The spacers 70 and 170 may support the lower thickness surface 24 of the light guide plate 20 while being coupled to the rear chassis 90. Because the light guide plate 20 receives an external force that is applied downward due to its own weight, the lower thickness surface 24 of the light guide plate 20 may be supported by the spacers 70 and 170 and thus the light guide plate 20 may be fixed.

As mentioned above, the lower thickness surface 24 of the light guide plate 20 is supported by the spacers 70 and 170, and thus when the light guide plate 20 is thermally expanded, the upper thickness surface 23 of the light guide plate 20 may move upward while the position of the lower thickness surface 24 of the light guide plate 20 is maintained.

The backlight unit may include a reflective sheet 16 preventing light loss by reflecting light, and various optical sheets 15 for improving light characteristics.

The reflective sheet 16 may be disposed on a rear surface of the light guide plate 20 to allow the light emitted from the light source 31 to be incident to the light guide plate 20 or to allow the light exited from the light guide plate 20 to be incident back to the light guide plate 20.

The optical sheet 15 may include a quantum dot sheet configured to improve color reproducibility by changing the wavelength of light. Inside the quantum dot sheet, quantum dots, which are semiconductor crystals with a size of several nanometers that emit light, may be dispersed and disposed. Quantum dots may receive blue light and generate light of various wavelengths, that is, all colors of visible light, depending on their size. The optical sheet 15 may include a diffusion sheet to cancel the effect of the pattern of the light guide plate 20. The optical sheet 15 may include a prism sheet configured to improve luminance by concentrating light.

The display apparatus 1 may include the chassis assembly provided to accommodate and support the liquid crystal panel 10 and the backlight unit. The chassis assembly may include a front chassis 80, a middle mold 85, and a rear chassis 90.

The front chassis 80 may be provided in a rectangular frame shape on the front surface of the display apparatus 1. The front chassis 80 may include a bezel member 81 forming a bezel and a rear extension 82 extending backward from the bezel member 81.

The middle mold 85 may be coupled to the rear of the front chassis 80. The middle mold 85 may include a side member 86 provided in a rectangular frame shape and an intermediate support member 87 protruding from the side member 86 to support the light guide plate 20 and the optical sheet 15.

The rear chassis 90 may have a substantially plate shape and may be coupled to the rear of the middle mold 85. The rear chassis 90 may be formed of a metal material such as aluminum or SUS having good thermal conductivity to dissipate heat generated from the light source 31 to the outside, or a plastic material such as ABS. The rear chassis 90 may include a base 91 disposed behind the light guide plate 20 and a front extension 92 extending forward from an edge of the base 91.

A rear cover forming a rear exterior of the display apparatus 1 may be coupled to the rear of the rear chassis 90. The aforementioned support leg 2 may be coupled to the rear cover.

Any one of the front chassis 80, the middle mold 85, and the rear chassis 90 may be omitted.

The display apparatus 1 may include holders 40 and 140 coupled to the rear chassis 90 to support the light guide plate 20. In this embodiment, the holders 40 and 140 may support the upper thickness surface 23 of the light guide plate 20. For this, the holders 40 and 140 may be provided in an upper portion of the rear chassis 90. Particularly, the holders 40 and 140 may be provided at an upper left corner of the rear chassis 90 and an upper right corner of the rear chassis 90, respectively.

Under the general distribution and normal use conditions, the movement of the light guide plate 20 may be prevented and the light guide plate 20 may be fixed because the lower thickness surface 24 of the light guide plate 20 is supported by the spacers 70 and 170, and the upper thickness surface 23 of the light guide plate 20 is supported by the holders 40 and 140.

The light guide plate 20 may be thermally expanded under a high-temperature condition in which the temperature rises due to heat generated when the display apparatus 1 is driven. When the light guide plate 20 is thermally expanded, the light guide plate 20 may be expanded in the up and down direction and the left and right direction.

In this embodiment, the lower thickness surface 24 of the light guide plate 20 is supported by the spacers 70 and 170 to maintain the gap G with the light source 31. Therefore, even when the light guide plate 20 is thermally expanded, the position of the lower thickness surface 24 of the light guide plate 20 may not change. On the other hand, when the light guide plate 20 is thermally expanded, the upper thickness surface 23 of the light guide plate 20 may move upward (E direction in FIG. 13) as the holders 40 and 140 are contracted and deformed. Conversely, when the high temperature condition changes to the normal condition, the light guide plate may be contracted and the holders 40 and 140 may return to their original state. That is, the holders 40 and 140 may be provided to be restored to a circular shape by elasticity.

As mentioned above, when the light guide plate 20 is thermally expanded, the holders 40 and 140 may be elastically deformed to allow the light guide plate 20 to be stably expanded. Accordingly, it is possible to prevent abnormal deformation such as bending or locally protruding of the light guide plate 20 and to improve the reliability of the display apparatus 1.

Hereinafter the structure of the holders 40 and 140 according to the embodiment will be described in detail.

Figure 5:
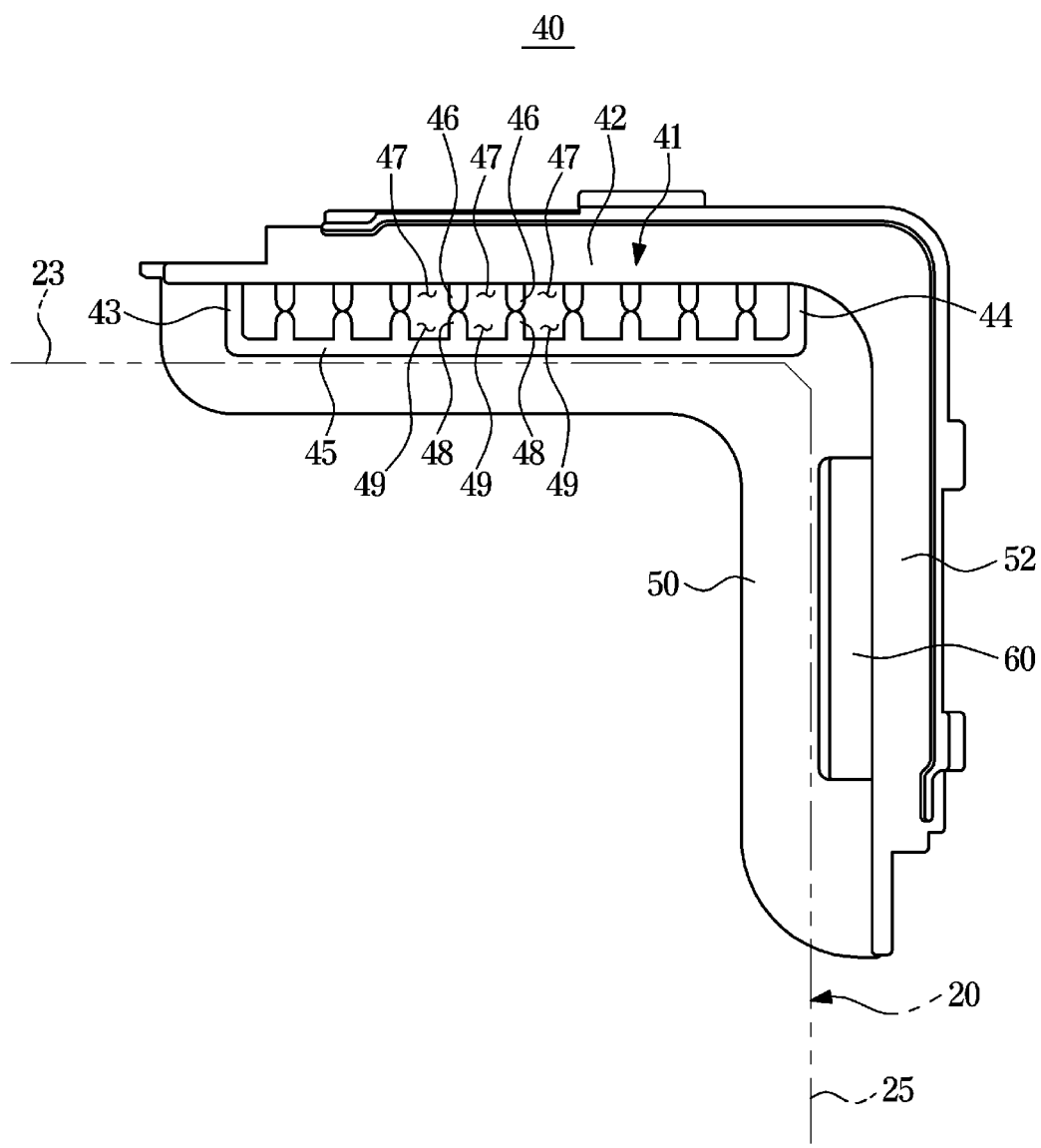
FIG. 5 is a front view illustrating a holder according to an embodiment of the disclosure.
Figure 6:
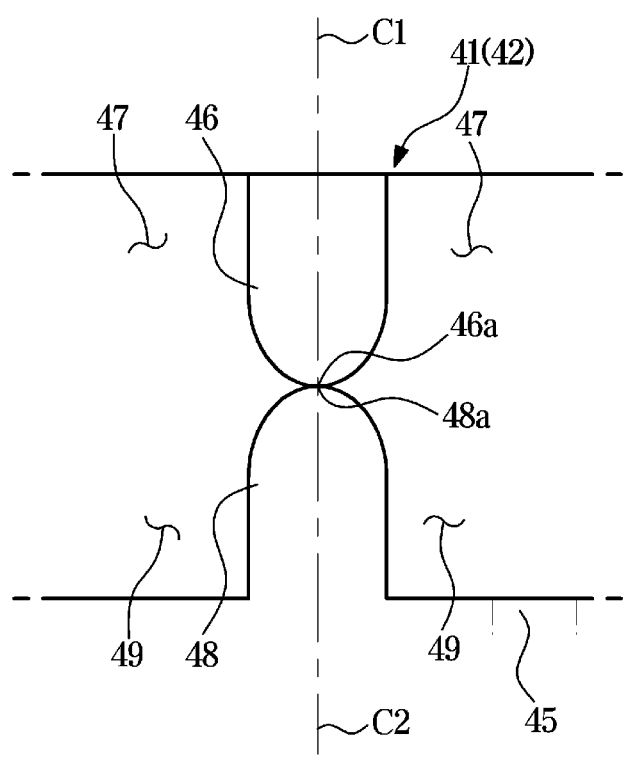
FIG. 6 is an enlarged view of a first tooth and a second tooth of the holder according to an embodiment of the disclosure.
Figure 7:
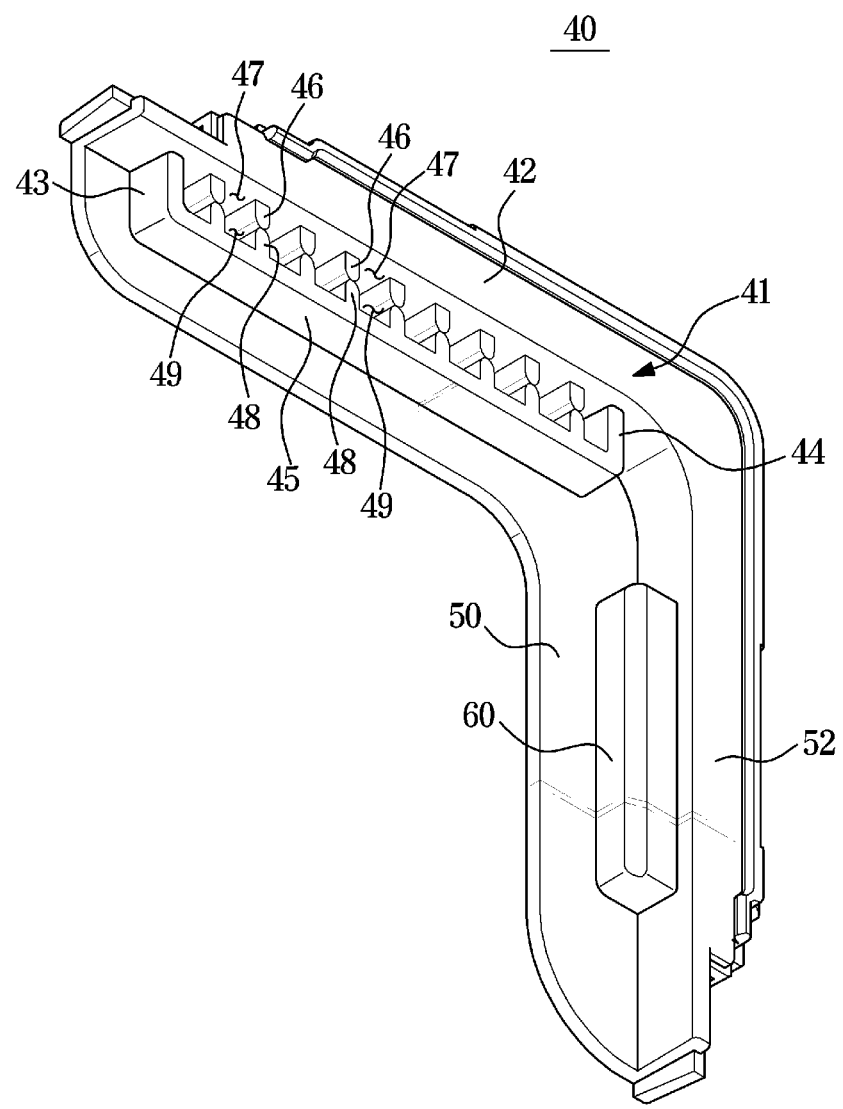
FIG. 7 is a perspective view of the holder according to an embodiment of the disclosure.
Figure 8:
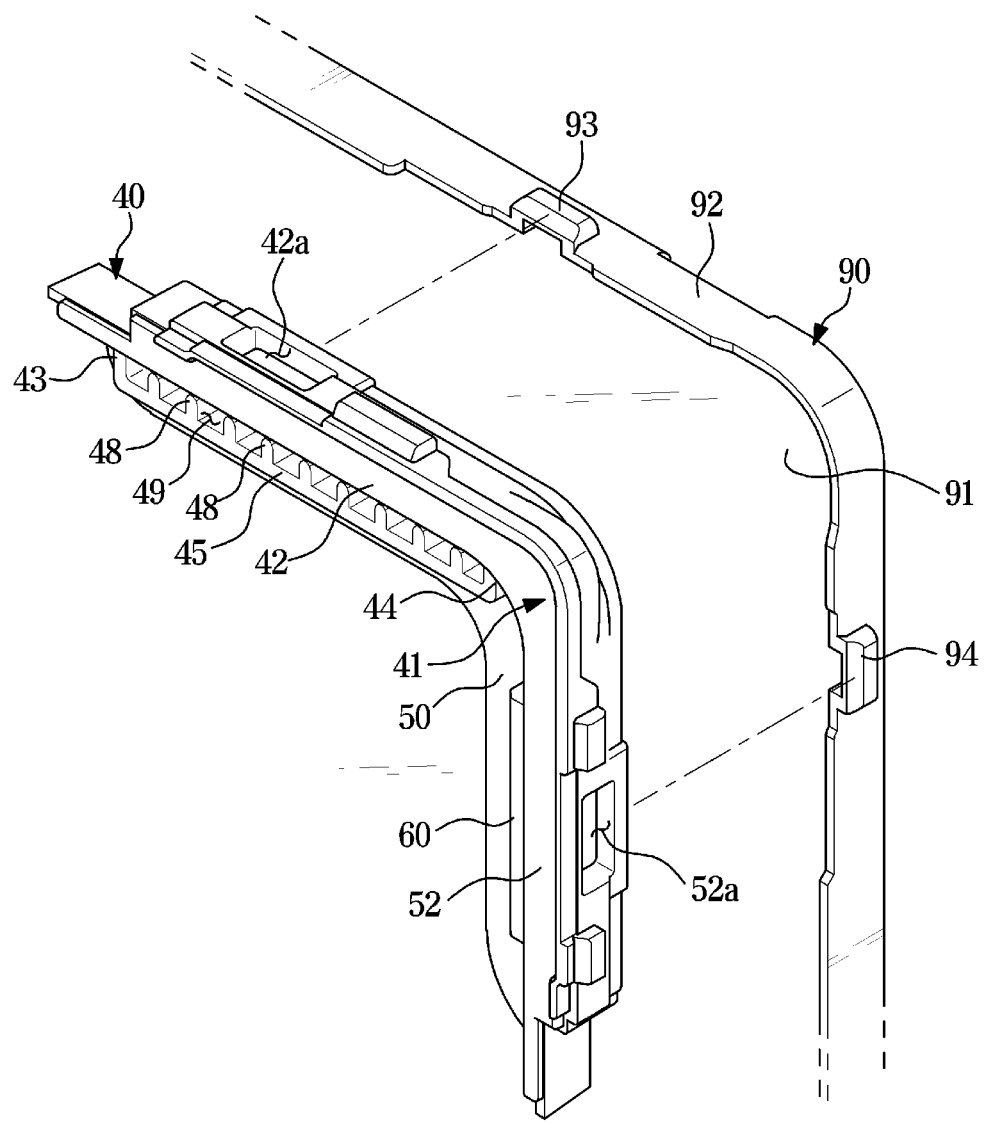
FIG. 8 is a perspective view illustrating a state in which the holder and a rear chassis are separated according to an embodiment of the disclosure.
Figure 9:
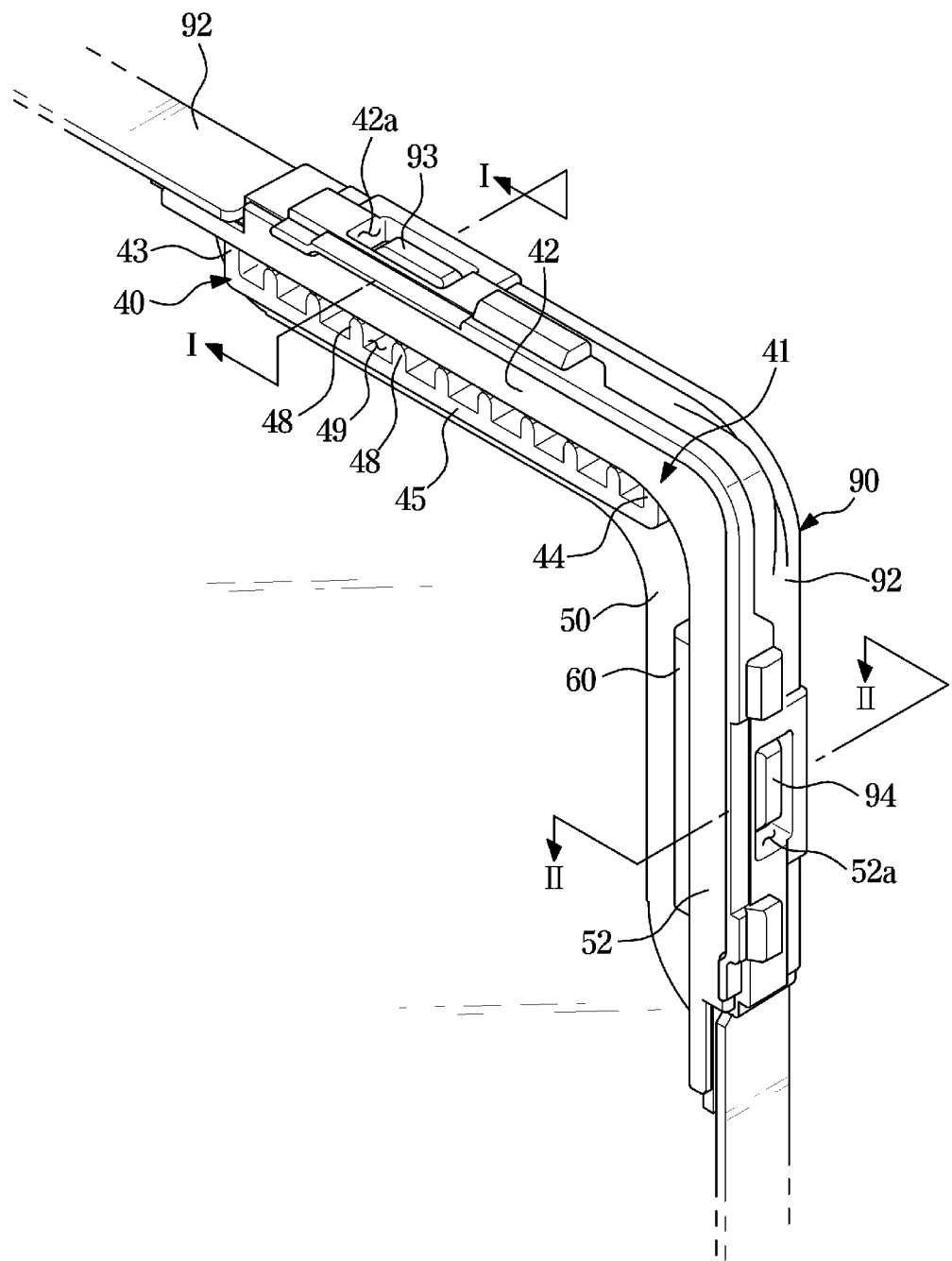
FIG. 9 is a perspective view illustrating a state in which the holder and the rear chassis are coupled according to an embodiment of the disclosure.

FIG. 5 is a front view illustrating a holder according to an embodiment of the disclosure. FIG. 6 is an enlarged view of a first tooth and a second tooth of the holder according to an embodiment of the disclosure. FIG. 7 is a perspective view of the holder according to an embodiment of the disclosure. FIG. 8 is a perspective view illustrating a state in which the holder and a rear chassis are separated according to an embodiment of the disclosure. FIG. 9 is a perspective view illustrating a state in which the holder and the rear chassis are coupled according to an embodiment of the disclosure.

Figure 10:
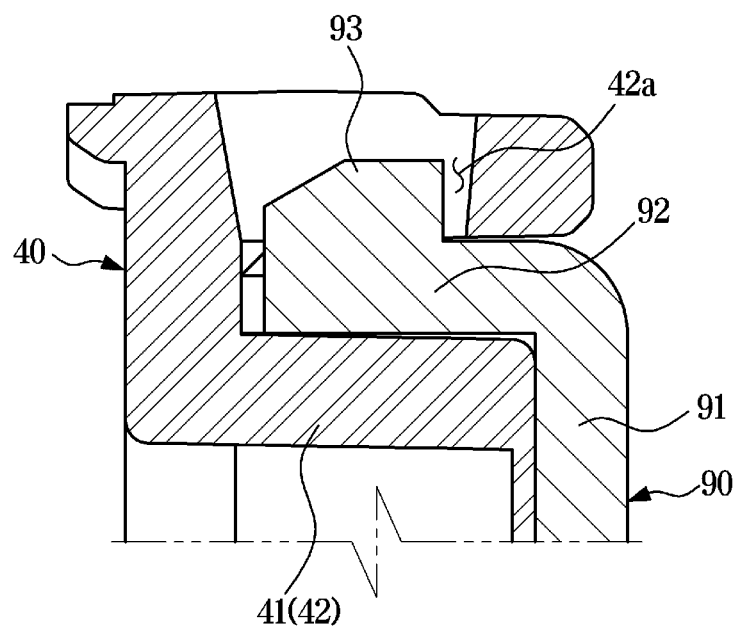
FIG. 10 is a cross-sectional view taken along line I-I of FIG. 9.
Figure 11:
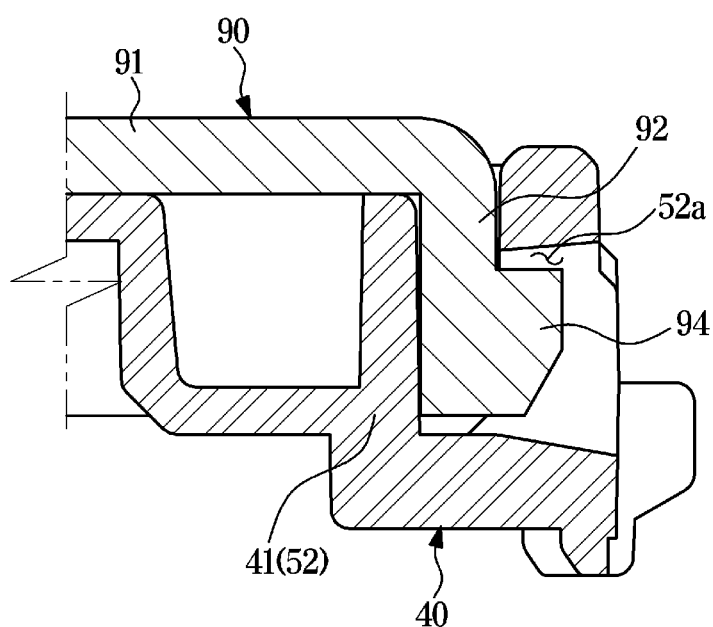
FIG. 11 is a cross-sectional view taken along line II-II of FIG. 9.
Figure 12:
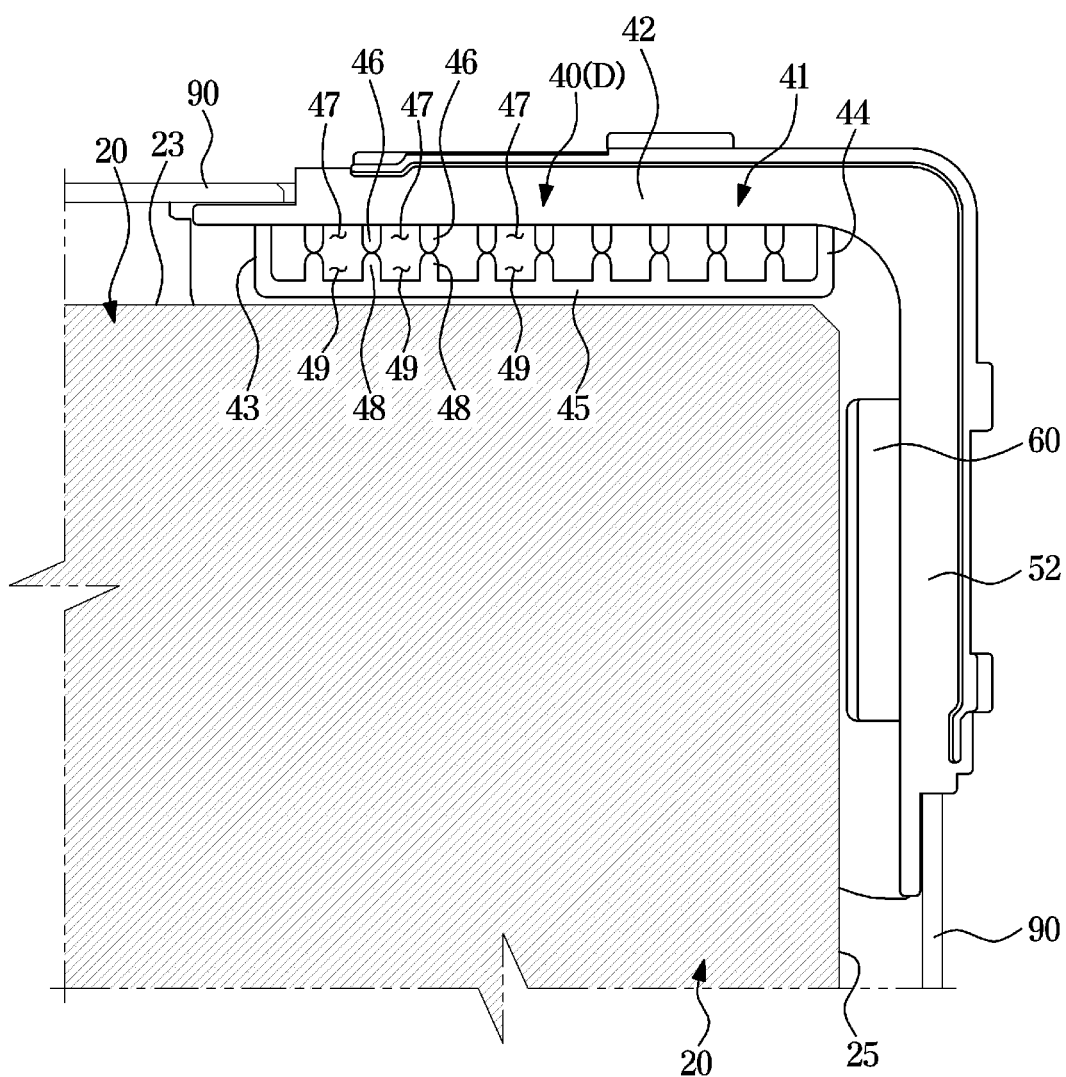
FIG. 12 is a view illustrating a state in which the holder is in a basic position before thermal expansion of the light guide plate according to an embodiment of the disclosure.
Figure 13:
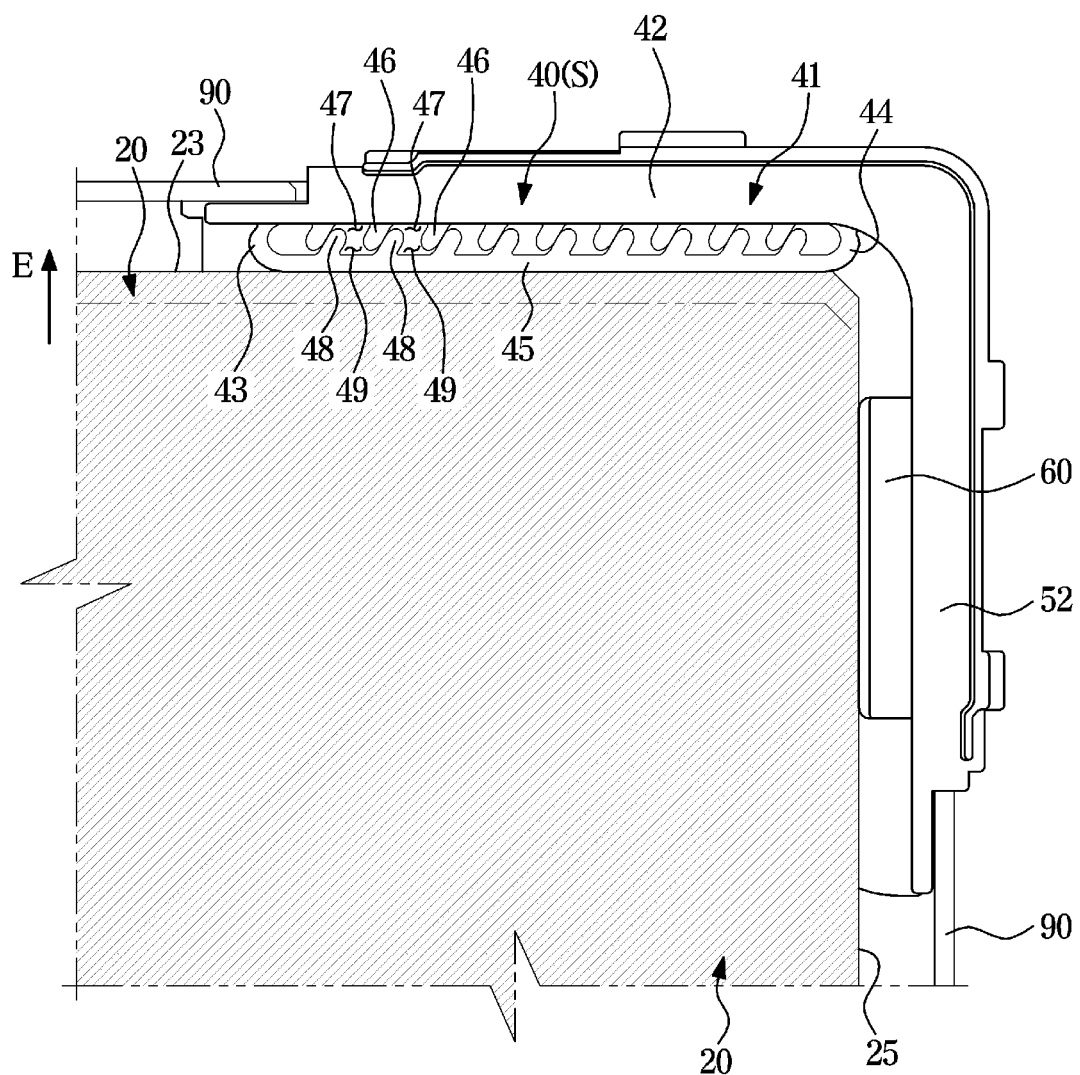
FIG. 13 is a view illustrating a state in which the holder is deformed into an engagement position due to thermal expansion of the light guide plate according to an embodiment of the disclosure.

FIG. 10 is a cross-sectional view taken along line I-I of FIG. 9. FIG. 11 is a cross-sectional view taken along line II-II of FIG. 9. FIG. 12 is a view illustrating a state in which the holder is in a basic position before thermal expansion of the light guide plate according to an embodiment of the disclosure. FIG. 13 is a view illustrating a state in which the holder is deformed into an engagement position due to thermal expansion of the light guide plate according to an embodiment of the disclosure.

Referring to FIGS. 5 to 13, the holder 40 may be coupled to the upper left corner of the rear chassis 90. The holder 40 may support the upper thickness surface 23 of the light guide plate 20.

The holder 40 may include a holder body 41. The holder body 41 may be coupled to the rear chassis 90. The holder body 41 may include a horizontal body member 42 extending in the left and right direction of the display apparatus 1 and a vertical body member 52 extending in the up and down direction of the display apparatus 1. The horizontal body member 42 and the vertical body member 52 may be integrally formed with each other.

The holder body 41 may include locking grooves 42a and 52a to which locking protrusions 93 and 94 of the rear chassis 90 are fitted and coupled. The locking groove 42a may be formed in the horizontal body member 42 and the locking groove 52a may be formed in the vertical body member 52.

The holder 40 may include a light guide plate support 45 provided to support the light guide plate 20 and spaced apart from the holder body 41. The light guide plate support 45 may be formed under the horizontal body member 42 and may be parallel to the horizontal body member 42. The light guide plate support 45 may extend in the left and right direction of the display apparatus 1. The light guide plate support 45 may support the upper thickness surface 23 of the light guide plate 20.

The holder 40 may include elastic connectors 43 and 44 connecting the horizontal body member 42 and the light guide plate support 45. The elastic connector 43 may connect one end of the horizontal body member 42 and one end of the light guide plate support 45. The elastic connector 44 may connect the other end of the horizontal body member 42 and the other end of the light guide plate support 45. The elastic connector 43 and the elastic connector 44 may be spaced apart from each other.

Accordingly, the horizontal body member 42, the elastic connector 44, the light guide plate support 45, and the elastic connector 43 may form a loop shape. A separation space may be formed inside the horizontal body member 42, the elastic connector 44, the light guide plate support 45, and the elastic connector 43.

When an external force is applied from the light guide plate 20 due to expansion of the light guide plate 20, the elastic connectors 43 and 44 may be deformed and thus a vertical length thereof may be reduced. That is, the elastic connectors 43 and 44 may maintain a linear shape in the up and down direction under normal conditions but may be elastically deformed to an arc shape under a high temperature condition. When the condition changes from the high-temperature condition to the normal condition, the elastic connectors 43 and 44 may be restored to their original shapes by the elasticity.

The holder 40 may include a first tooth 46 protruding from the horizontal body member 42 and a second tooth 48 protruding from the light guide plate support 45 to correspond to the first tooth 46. The first tooth 46 and the second tooth 48 may be formed to be separated from each other so as to be movable between a basic position 40(D) and an engagement position 40(S). Therefore, in the basic position 40(D), the first tooth 46 and the second tooth 48 may be in contact with each other, but in the engagement position 40(S), the first tooth 46 and the second tooth 48 may be in contact with each other or spaced apart from each other according to embodiments.

A first tooth groove 47 may be formed next to the first tooth 46. A second tooth groove 49 may be formed next to the second tooth 48.

The first tooth 46 may protrude from the horizontal body member 42 toward the light guide plate support 45. The first tooth 46 may be formed perpendicular to the horizontal body member 42. One first tooth or a plurality of first teeth may be provided. When the plurality of first teeth 46 is provided, the first teeth 46 may be arranged in a line and spaced apart from each other. The first teeth 46 may be arranged in a line along the left and right direction of the display apparatus 1. When the plurality of first teeth 46 is provided, the first tooth groove 47 may be formed between adjacent first teeth 46.

The second tooth 48 may protrude from the light guide plate support 45 toward the horizontal body member 42. The second tooth 48 may be formed perpendicular to the light guide plate support 45. One second tooth or a plurality of second teeth may be provided. When the plurality of second teeth 48 is provided, the second teeth 48 may be arranged in a line and spaced apart from each other. The second teeth 48 may be provided to be spaced apart from each other along the left and right direction of the display apparatus 1. When the plurality of second teeth 48 is provided, the second tooth groove 49 may be formed between adjacent second teeth 48.

As described above, the horizontal body member 42, the elastic connector 44, the light guide plate support 45, and the elastic connector 43 may form a loop shape, and a separation space may be formed inside the horizontal body member 42, the elastic connector 44, the light guide plate support 45, and the elastic connector 43.

The first tooth 46 and the second tooth 48 may be disposed in the separation space. Particularly, the first tooth 46 and the second tooth 48 may be disposed between the horizontal body member 42 and the light guide plate support 45. The first tooth 46 and the second tooth 48 may be disposed between the elastic connector 43 and the elastic connector 44.

As shown in FIGS. 12 and 13, the holder 40 may be elastically deformable between the basic position 40(D) and the engagement position 40(S).

In the basic position 40(D), the first tooth 46 may be disposed outside the second tooth groove 49 and the second tooth 48 may be disposed outside the first tooth groove 47. In the basic position 40(D), the first tooth 46 and the second tooth 48 may be supported by each other (i.e., may be in contact with one another). In the basic position 40(D), the first tooth 46 may be maintained perpendicular to the horizontal body member 42, and the second tooth 48 may be maintained perpendicular to the light guide plate support 45.

In the engagement position 40(S), the first tooth 46 may be inserted into the second tooth groove 49 and the second tooth 48 may be inserted into the first tooth groove 47.

In the engagement position 40(S), the first tooth 46 may be inclined with respect to the horizontal body member 42. In the engagement position 40(S), the second tooth 48 may be inclined with respect to the light guide plate support 45.

In this embodiment, the first tooth 46 and the second tooth 48 may be supported by each other (i.e., are in contact with one another) in the engagement position 40(S). However, unlike the embodiment, the first tooth 46 and the second tooth 48 may be inserted more deeply in the engagement position 40(S), and thus the first tooth 46 may be supported by (i.e., come into contact with) the light guide plate support 45 and the second tooth 48 may be supported by the horizontal body member 42.

As illustrated in FIG. 6, the first tooth 46 may include a first end support surface 46a formed at an end of the first tooth 46. The second tooth 48 may include a second end support surface 48a formed at an end of the second tooth 48. In the basic position 40(D) of the holder 40, the first end support surface 46a and the second end support surface 48a may be supported by each other.

The first end support surface 46a and the second end support surface 48a may be convex relative to one another. The first end support surface 46a and the second end support surface 48a may be formed as curved surfaces. Therefore, when the light guide plate 20 is thermally expanded under the high-temperature condition, the first end support surface 46a and the second end support surface 48a may slide on each other, and thus the holder 40 may be deformed smoothly to the engagement position 40(S).

In the basic position 40(D), a central axis C1 of the first tooth 46 and a central axis C2 of the second tooth 48 may be substantially disposed on the same line. However, the central axis C1 of the first tooth 46 and the central axis C2 of the second tooth 48 may be disposed to slightly deviate from each other on the same line to allow the holder 40 to be smoothly deformed into the engagement position 40(S).

The holder 40 may be formed of an elastic material such as rubber. For example, the holder 40 may be formed of a polycarbonate (PC) material, an ABS material, or an engineering plastic material in which ABS and polycarbonate (PC) are mixed. Therefore, the shape of the holder 40 may be well maintained even under general external impacts, and conversely, when an external force, which is due to the gradual thermal expansion of the light guide plate 20, exceeds a critical value, the shape may be deformed.

The holder 40 may be integrally formed. That is, the holder body 41, the light guide plate support 45, the elastic connectors 43 and 44, the first tooth 46, and the second tooth 48 may be integrally formed, and formed at once through injection molding or the like.

The holder 40 may include a reinforcing member 50 extending from the holder body 41 toward the light guide plate 20 to allow the shape of the holder 40 to be better maintained. The light guide plate support 45, the elastic connectors 43 and 44, the first tooth 46, and the second tooth 48 may be connected to a front surface of the reinforcing member 50.

The holder 40 may include a horizontal support 60 provided to support the left thickness surface 25 of the light guide plate 20.

As described above, the display apparatus 1 may include the holder 40 mounted on the upper left corner of the rear chassis 90 and the holder 140 mounted on the upper right corner of the rear chassis 90. The holder 140 may correspond to the configuration of the holder 40 except the holder 140 and the holder 40 are bilaterally symmetrical.

Figure 14:
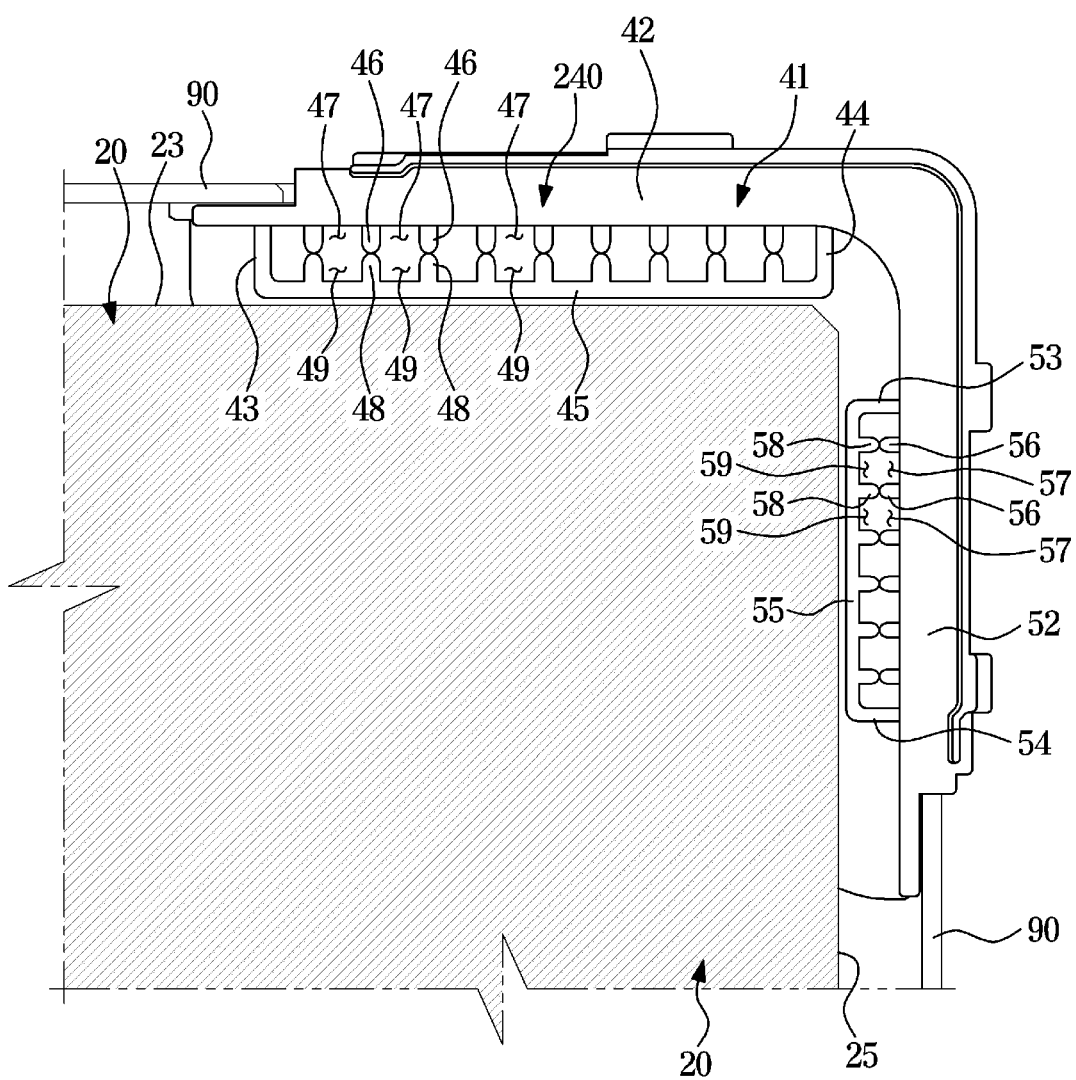
FIG. 14 is a view illustrating a holder according to an embodiment of the disclosure.

FIG. 14 is a view illustrating a holder according to an embodiment of the disclosure.

The same reference numerals are assigned to components the same as those of the above-described embodiment, and descriptions thereof may be omitted.

According to an embodiment of the disclosure, a holder 240 may include a holder body 41. The holder body 41 may include a horizontal body member 42 extending in the left and right direction of the display apparatus 1 and a vertical body member 52 extending in the up and down direction of the display apparatus 1. The horizontal body member 42 and the vertical body member 52 may be integrally formed with each other.

The holder 240 may include elastic connectors 53 and 54 connecting the vertical body member 52 and a light guide plate support 55. The elastic connector 53 may connect one end of the vertical body member 52 and one end of the light guide plate support 55. The elastic connector 54 may connect the other end of the vertical body member 52 and the other end of the light guide plate support 55. The elastic connector 53 and the elastic connector 54 may be spaced apart from each other.

Accordingly, the vertical body member 52, the elastic connector 54, the light guide plate support 55, and the elastic connector 53 may form a loop shape. A separation space may be formed inside the vertical body member 52, the elastic connector 54, the light guide plate support 55, and the elastic connector 53.

The holder 240 may include a third tooth 56 protruding from the vertical body member 52 and a fourth tooth 58 protruding from the light guide plate support 55 to correspond to the third tooth 56. The third tooth 56 and the fourth tooth 58 may be formed to be separated from each other so as to be movable between the basic position 40(D) and the engagement position 40(S).

A third tooth groove 57 may be formed next to the third tooth 56. A fourth tooth groove 59 may be formed next to the fourth tooth 58.

The third tooth 56 may protrude from the vertical body member 52 toward the light guide plate support 55. The third tooth 56 may be formed perpendicular to the vertical body member 52. One third tooth or a plurality of third teeth 56 may be provided. When a plurality of third teeth 56 is provided, the third teeth 56 may be arranged in a line and spaced apart from each other. The third teeth 56 may be arranged in a line along the up and down direction of the display apparatus 1. When the plurality of third teeth 56 is provided, the third tooth groove 57 may be formed between adjacent third teeth 56.

The fourth tooth 58 may protrude from the light guide plate support 55 toward the vertical body member 52. The fourth tooth 58 may be formed perpendicular to the light guide plate support 55. One fourth tooth or a plurality of fourth teeth may be provided. When the plurality of fourth teeth 58 is provided, the fourth teeth 58 may be arranged in a line and spaced apart from each other. The fourth teeth 58 may be spaced apart from each other along an up and down direction of the display apparatus 1. When the plurality of fourth teeth 58 is provided, the fourth tooth groove 59 may be formed between adjacent fourth teeth 58.

As mentioned above, the holder 240 may be configured to be elastically deformable in the left and right direction according to the expansion of the light guide plate 20 in the left and right direction.

As is apparent from the above description, a light guide plate may be firmly supported under a general distribution and a normal use condition.

Further, a light guide plate may be stably supported even when the light guide plate is thermally expanded under high temperature conditions during driving of a display apparatus.

Further, it is possible to prevent a light guide plate from being bent or abnormally deformed when the light guide plate is thermally expanded under high temperature conditions during driving of a display apparatus. Accordingly, it is possible to improve reliability of the display apparatus.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
    a liquid crystal panel;
    a light guide plate behind the liquid crystal panel;
    a light source;
    a rear chassis behind the light guide plate; and
    a holder coupled to the rear chassis and supporting the light guide plate, wherein the holder comprises:
        a first tooth;
        a first tooth groove next to the first tooth;
        a second tooth facing the first tooth; and
        a second tooth groove next to the second tooth,
    wherein in a first state, the first tooth is disposed outside the second tooth groove and the second tooth is disposed outside the first tooth groove, and in a second state, the first tooth is inserted into the second tooth groove and the second tooth is inserted into the first tooth groove, and
    wherein the first tooth and the second tooth are configured to elastically deform between the first state and the second state.

2. The display apparatus of claim 1, wherein the first tooth comprises a first end support surface at an end of the first tooth,
    wherein the second tooth comprises a second end support surface at an end of the second tooth, and
    wherein the first end support surface and the second end support surface contact each other in the first state.

3. The display apparatus of claim 2, wherein each of the first end support surface and the second end support surface is convex.

4. The display apparatus of claim 2, wherein each of the first end support surface and the second end support surface is a curved surface.

5. The display apparatus of claim 1, wherein the first tooth and the second tooth are separated from each other in the first state.

6. The display apparatus of claim 1, wherein the holder further comprises:
    a holder body;
    a light guide plate support supporting the light guide plate and spaced apart from the holder body; and
    a first elastic connector connecting the holder body and the light guide plate support,
    wherein the first tooth and the second tooth are disposed between the holder body and the light guide plate support.

7. The display apparatus of claim 6, wherein the first tooth protrudes from the holder body toward the light guide plate support, and
    wherein the second tooth protrudes from the light guide plate support toward the holder body.

8. The display apparatus of claim 7, wherein the first elastic connector extends from a first end of the light guide plate support in a longitudinal direction.

9. The display apparatus of claim 8, further comprising:
    a second elastic connector connecting the holder body and the light guide plate support, wherein the second elastic connector extends from a second end of the light guide plate support in the longitudinal direction.

10. The display apparatus of claim 9, wherein the first tooth and the second tooth are disposed between the first elastic connector and the second elastic connector.

11. The display apparatus of claim 1, wherein the holder further comprises another first tooth next to the first tooth, and
    wherein the first tooth groove is between the first tooth and the other first tooth.

12. The display apparatus of claim 11, wherein the holder comprises another second tooth next to the second tooth, and faces the other first tooth, and
    wherein the second tooth groove is between the second tooth and the other second tooth.

13. The display apparatus of claim 1, wherein the holder further comprises a locking groove fitted and coupled to a locking protrusion of the rear chassis.

14. The display apparatus of claim 1, further comprising:
    a spacer configured to maintain a constant gap between the light guide plate and the light source, wherein the light source is adjacent to a thickness surface of the light guide plate and is configured to emit light toward the thickness surface of the light guide plate.

15. The display apparatus of claim 14, wherein the spacer is coupled to the rear chassis.

16. A display apparatus comprising:
    a liquid crystal panel;
    a light guide plate behind the liquid crystal panel;
    a light source;
    a rear chassis behind the light guide plate; and
    a holder coupled to the rear chassis and supporting the light guide plate, wherein the holder comprises:
        a first tooth;
        a first tooth groove next to the first tooth;
        a second tooth facing the first tooth; and
        a second tooth groove next to the second tooth,
    wherein in a first state, the first tooth is disposed outside the second tooth groove and the second tooth is disposed outside the first tooth groove, and in a second state, the first tooth is inserted into the second tooth groove and the second tooth is inserted into the first tooth groove, and
    wherein the first tooth and the second tooth are configured to elastically deform between the first state and the second state based on thermal expansion of the light guide plate.

17. A display apparatus comprising:
    a rear chassis;
    a light source;
    a plate configured to receive and output light from the light source;
    a liquid crystal panel; and
    a holder coupled to the rear chassis and supporting the plate, wherein the holder comprises:
        a first tooth;
        a first tooth groove next to the first tooth;
        a second tooth facing the first tooth; and
        a second tooth groove next to the second tooth,
    wherein in a first state, the first tooth is disposed outside the second tooth groove and the second tooth is disposed outside the first tooth groove, and in a second state, the first tooth is inserted into the second tooth groove and the second tooth is inserted into the first tooth groove, and
    wherein the first tooth and the second tooth are configured to elastically deform between the first state and the second state based on thermal expansion of the plate.

* * * * *